March 29, 1932.     D. E. SPEICHER     1,851,780

POULTRY FEEDER

Filed Dec. 20, 1929

INVENTOR.
Daniel E. Speicher,
Geo. P. Kimmel
ATTORNEY.

Patented Mar. 29, 1932

1,851,780

UNITED STATES PATENT OFFICE

DANIEL E. SPEICHER, OF URBANA, INDIANA, ASSIGNOR TO THE CYCLONE MANUFACTURING COMPANY, OF URBANA, INDIANA, A CORPORATION

POULTRY FEEDER

Application filed December 20, 1929. Serial No. 415,498.

This invention relates to a poultry feeder of the trough type designed primarily for the feeding of chicks, but it is to be understood that a poultry feeder, in accordance with this invention may be employed in any connection for which it is found applicable, and the invention has for its object to provide, in a manner as hereinafter set forth, a feeder including a feed guard for shutting off the feeding trough sufficiently to prevent the very small chicks from getting into the feed or feeder; and further whereby the guard can be adjusted to allow for a size of the chicks' growing heads to permit of ready access to the feed, at the same time preventing waste or entrance of the fowls into the trough.

A further object of the invention is to provide, in a manner as hereinafter set forth, and for the purpose referred to, an imperforate, upwardly and outwardly adjustable feed guard for use in connection with poultry feeders of the trough type.

A further object of the invention is to provide, in a manner as hereinafter set forth and for the purpose referred to, an imperforate, upwardly and outwardly adjustable feed guard for use in connection with poultry feeders of the trough type and with the guard so constructed and arranged to prevent injury to the fowl when the latter is feeding.

A further object of the invention is to provide, in a manner as hereinafter set forth and for the purpose referred to, an inverted, yoke-shaped, imperforate, upwardly and outwardly adjustable feed guard for use in connection with poultry feeders of the trough type and having associated therewith releasable means forming a pivot therefor and further providing for maintaining the guard in set position.

Further objects of the invention are to provide, in a manner as hereinafter set forth, an imperforate, upwardly and outwardly adjustable feed guard which is simple in its construction and arrangement, strong, durable, compact, thoroughly efficient in its use, readily installed with respect to a feed trough and inexpensive to manufacture.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views.

Figure 1:
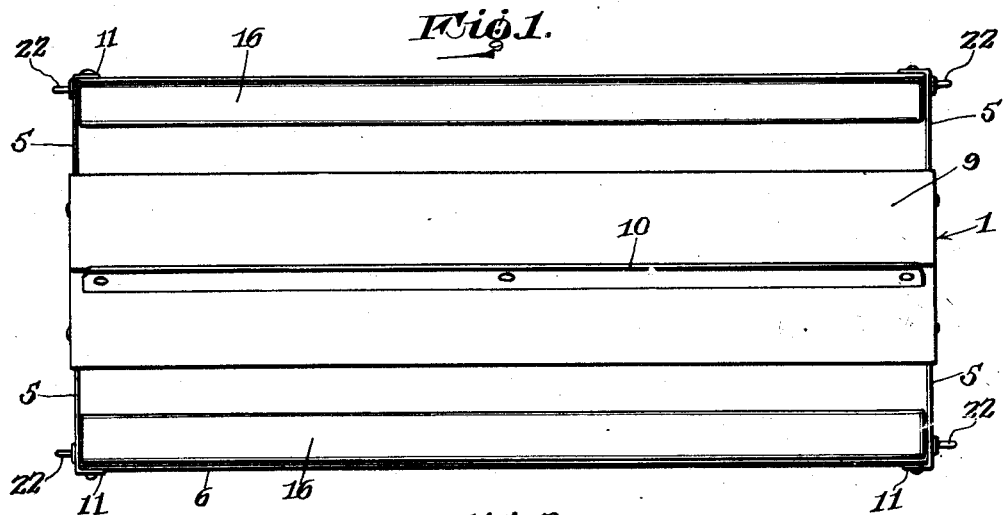
Figure 1 is a top plan view of a poultry feeder including a pair of feed troughs and showing the adaptation with the troughs of a pair of feed guards in accordance with this invention.
Figure 2:
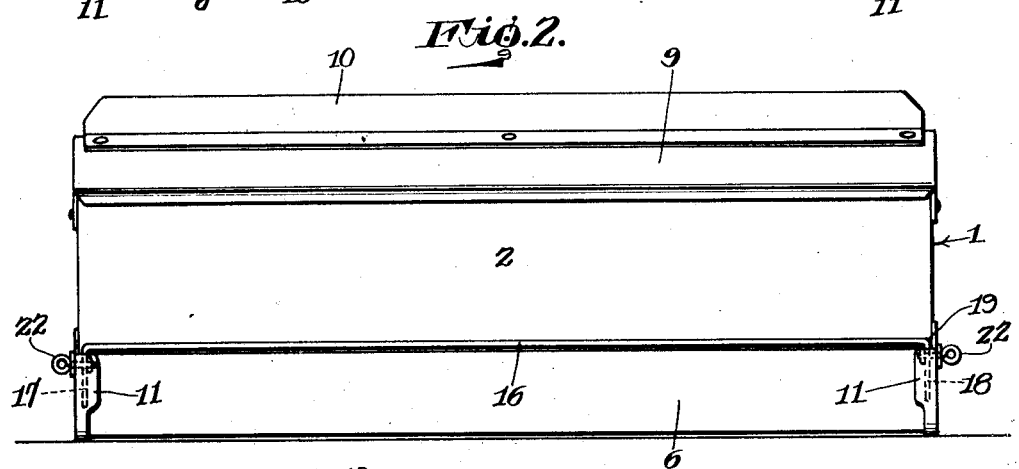
Figure 2 is a side elevation of the feeder having a guard in accordance with this invention installed in connection therewith.
Figures 3, 4:
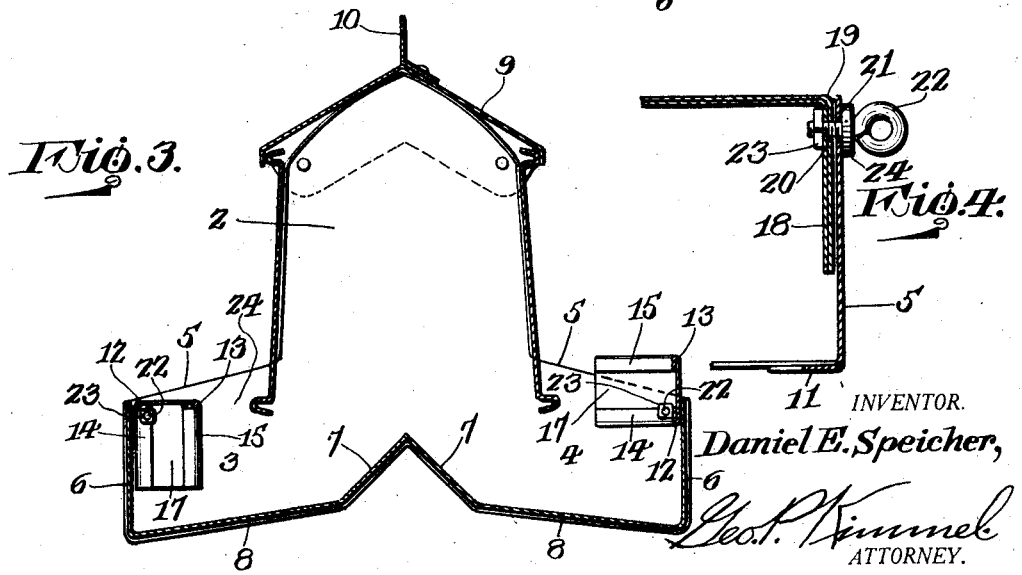
Figure 3 is a cross sectional view of the feeder showing the adaptation with the trough thereof of a pair of feed guards in accordance with this invention.
Figure 4 is a fragmentary view in sectional plan illustrating the guard and the means employed for connecting it to the feeder.

Although there is illustrated a poultry feeder of the type having a pair of feed troughs and with the feed guards, in accordance with this invention installed with respect to the feed troughs, but it is to be understood that the guard may be employed with a single trough feeder when desired.

Referring to the drawings 1 generally indicates a poultry feeder provided with a feed chute 2 which is disposed centrally with respect to and discharges into a pair of upwardly extending troughs 3, 4 projecting laterally in both directions with respect to the bottom of the chute 2. Each trough includes a pair of end walls 5, a front wall 6, an inclined rear wall 7 of less height than the front wall, and a bottom 8. The rear wall 7 of each trough projects rearwardly at an inclination and the bottom of each trough extends downwardly at an inclination from the rear wall 7 to the front wall 6. The walls of the chute 2 extend into the troughs 3, 4 and terminate a substantial distance above the bottoms of said troughs. The rear walls 7 are disposed centrally with respect to the chute 2. A removable top 9 is mounted upon the chute 2 and is provided with upstanding means as indicated at 10 to prevent perching. As illustrated the end walls 5 are bent against the outer face of the front walls 6 and suitably connected with the latter as at 11.

The feed guard is of inverted yoke-shape and formed from a flat strip of sheet metal of the desired length and width folded upon itself throughout its length to provide a rounded front and a rounded rear edge 12, 13 respectively. The edges being rounded prevent any possibility of injury to the chicks or fowls when feeding. The folds are indicated at 14, 15 and extend from one end to the other end of the strip.

The guard includes an elongated, narrow, oblong body part 16 and a pair of rectangular end parts 17, 18 which extend inwardly from and at right angles to and are of the same width as the body part 16. When the guard is arranged within a trough the end parts 17, 18 thereof are located in proximity to the inner faces of the end walls of the trough.

In proximity to the bend 19 between an end part and the body part the end part is formed with an opening 20 which registers with an opening 21 formed in an end wall 5. The opening 21 is positioned in the end wall 5 in close proximity to the top edge thereof and in close proximity to the front wall 6 of the trough. The opening 20 is arranged also in the forward fold 14 of the end part.

Extending through the registering openings 20, 21 is an eye bolt 22 carrying on its inner end a clamping nut 23 and further carrying a washer 24 which is interposed between the end wall 5 and the eye of the bolt. The openings 20 provide for the mounting of the end parts 17, 18 eccentrically thereof on the bolts 22.

The bolt 22 provides a pivot for an end part and said bolt in connection with the nut 23 provides means for releasably clamping the guard in set position.

The width of the body part 16 of the guard is such as to provide for a passage between the guard and the lower end of the chute 2 and such passage is indicated at 24. By adjusting the guard outwardly on its pivot will increase the width of the passage 24. The guard prevents the very small chicks from getting into the feed or feeder and also acts to prevent waste of feed. The guard is adjusted outwardly to increase the width of the passage 24 to allow for the size of the chicks' growing heads to permit of ready access to the feed, and when adjusted outwardly it will also prevent waste of feed.

It is thought the many advantages of an imperforate, upwardly and outwardly adjustable feed guard, in accordance with this invention, for use in connection with poultry feeders can be readily understood, and although the preferred embodiment of the invention is as illustrated and described, yet it is to be understood that changes in the details of construction can be had which fall within the scope of the invention as claimed.

What I claim is:

1. In poultry feeders of the trough type, a pair of releasable, combined clamping and pivot forming devices for insertion through the end walls of the trough, and an adjustable, flat, inverted, yoke-shaped, one-piece guard to be positioned in said trough and including an elongated, narrow, oblong body part and a pair of right angularly disposed rectangular end parts depending from the ends of said body part, pivotally mounted eccentrically thereof on said devices and in contact with end walls of the trough, said devices providing means for releasably clamping said guard in set position.

2. In poultry feeders of the trough type, a pair of releasable, combined clamping and pivot forming devices for insertion through the end walls of the trough, and an adjustable, flat, inverted, yoke-shaped, one-piece guard to be positioned in said trough and including an elongated, narrow, oblong body part and a pair of right angularly disposed rectangular end parts depending from the ends of said body part, pivotally mounted on said devices and in contact with end walls of the trough, said devices providing means for releasably clamping said guard in set position, said end parts mounted on said devices in proximity to the point of joinder of the end parts with said body part.

3. In poultry feeders of the trough type, a pair of releasable, combined clamping and pivot forming devices for insertion through the end walls of the trough, and an adjustable, flat, inverted, yoke-shaped, one-piece guard to be positioned in said trough and including an elongated, narrow, oblong body part and a pair of right angularly disposed rectangular end parts depending from the ends of said body part, pivotally mounted on said devices and in contact with end walls of said trough, said devices providing means for releasably clamping said guard in set position, said end parts provided with openings adjacent the free ends and in proximity to one side edge thereof for the passage of said devices.

4. In combination, a poultry feeder having a feed trough including a front and a pair of end walls, said end walls being provided with aligning openings near the top edges thereof and in proximity to said front wall, a one-piece, flat guard positioned within said trough and including an elongated, narrow, oblong body part and a pair of end parts disposed at right angles to and depending from the ends of said body part, said end parts in proximity to their forward edges and the points of joinder of the end parts with the body part formed with openings aligning with the openings in said walls, and means extending through said registering openings to provide pivots for said guard and to further provide means for clamping said guard in set position, said guard being adjustable outwardly and inwardly with respect to the top of the trough and having its lengthwise edges rounded throughout.

5. In poultry feeders of the trough type, a flat feed guard adapted to be positioned in the trough at the upper portion thereof and formed of an elongated, narrow, oblong body part and a pair of rectangular right angularly disposed end parts depending from the ends of said body part, said end parts in proximity to the body part formed with openings near the top thereof, a pair of bolts adapted to extend through the end walls of the trough and through said openings, said bolts providing pivots for the guard, said guard being adjustable outwardly and inwardly on its pivots with respect to the top of the trough, and clamping nuts mounted on said bolts for releasably securing the guard in adjusted position.

6. In combination, a poultry feeder provided with a feed trough having a front and a pair of end walls, said end walls provided with openings near the top thereof and in close proximity to said front wall, an adjustable flat guard positioned within the trough at the top thereof and in proximity to said front wall, said guard including depending end parts in contact with said end walls, said end part formed in proximity to their outer edges and in proximity to their tops with openings registering with the openings in said walls, and releasable, combined clamping and pivot forming devices extending through said registering openings for said guard.

7. In poultry feeders of the trough type, a feed guard positioned in the trough at the front of the upper portion and between the end walls of the latter, said guard being of inverted yoke shape and including a flat, narrow, elongated, oblong body part and a pair of end parts depending at right angles from the ends of the body part, each of said end parts provided with an opening positioned in proximity to its forward edge and top for the passage of a supporting means for the guard, and said guard having its lengthwise edges rounded throughout.

8. In poultry feeders of the trough type, a feed guard positioned in the trough at the front of the upper portion and between the end walls of the latter, said guard being of inverted yoke shape and including a flat, narrow, elongated, oblong body part and a pair of end parts depending at right angles from the ends of the body part, each of said end parts provided with an opening positioned in proximity to its forward edge and top, and a pair of combined pivotally supporting and clamping means for said guard including pivots extending through said openings and adapted to extend through said end walls, said guard being adjustable on said pivots.

In testimony whereof, I affix my signature hereto.

DANIEL E. SPEICHER.